July 22, 1941.  F. H. GULLIKSEN  2,249,821

ANGULAR SWITCHING DEVICE FOR SYNCHRONOUS MOTORS

Filed Aug. 11, 1939

Time
High Slip Freq.

Time
Lower Slip Freq.

WITNESSES:

INVENTOR
Finn H. Gulliksen.
BY
Paul E. Friedemann
ATTORNEY

Patented July 22, 1941

2,249,821

UNITED STATES PATENT OFFICE 2,249,821

ANGULAR SWITCHING DEVICE FOR SYNCHRONOUS MOTORS

Finn H. Gulliksen, Pittsburgh, Pa., assignor to Westinghouse Electric & Manufacturing Company, East Pittsburgh, Pa., a corporation of Pennsylvania Application August 11, 1939, Serial No. 289,549

9 Claims. (Cl. 172—289)

My invention relates to an automatic starting system for synchronous motors and the like.

More specifically, it is directed to electronic control means which is effective, not only to connect a direct current source to the field winding of the synchronous motor, when it has substantially reached synchronous speed, but which is effective also to apply such direct current energization at the correct moment which will afford maximum pull-in torque.

In the past, many schemes have been devised for withholding direct current energization of the field winding of the synchronous motor until very near synchronous speed of the motor has been obtained. Examples of such devices are a time delay relay, a relay responsive to the frequency of the induced voltage in the short-circuited field winding during starting, and a relay responsive to the frequency of the induced voltage in the armature or stator winding during starting. It has also been found during the past that it is necessary not only to effect switching at or near synchronous speed, but the switching should occur at a time when the induced field current has a certain polarity or better still, at the moment the pole pieces on which the field winding is wound are at a predetermined position with respect to a given point on the wave of alternating current supplied to the armature or stator winding in order to afford maximum pull-in torque at synchronization. This latter type of control is often referred to as "angle switching."

An object of my invention is to provide an electronic control means for the purpose of controlling application of the direct current source to the field winding of a synchronous motor so that energization of the field will occur only at near synchronous speed and including "angle switching" means for effecting energization of the field winding at a moment which will afford maximum pull-in torque of the motor at synchronization.

Another object of my invention is to provide an automatic control system for synchronous motor starting which is simple, inexpensive, instantaneously responsive, and reliable in operation.

Figure 1:
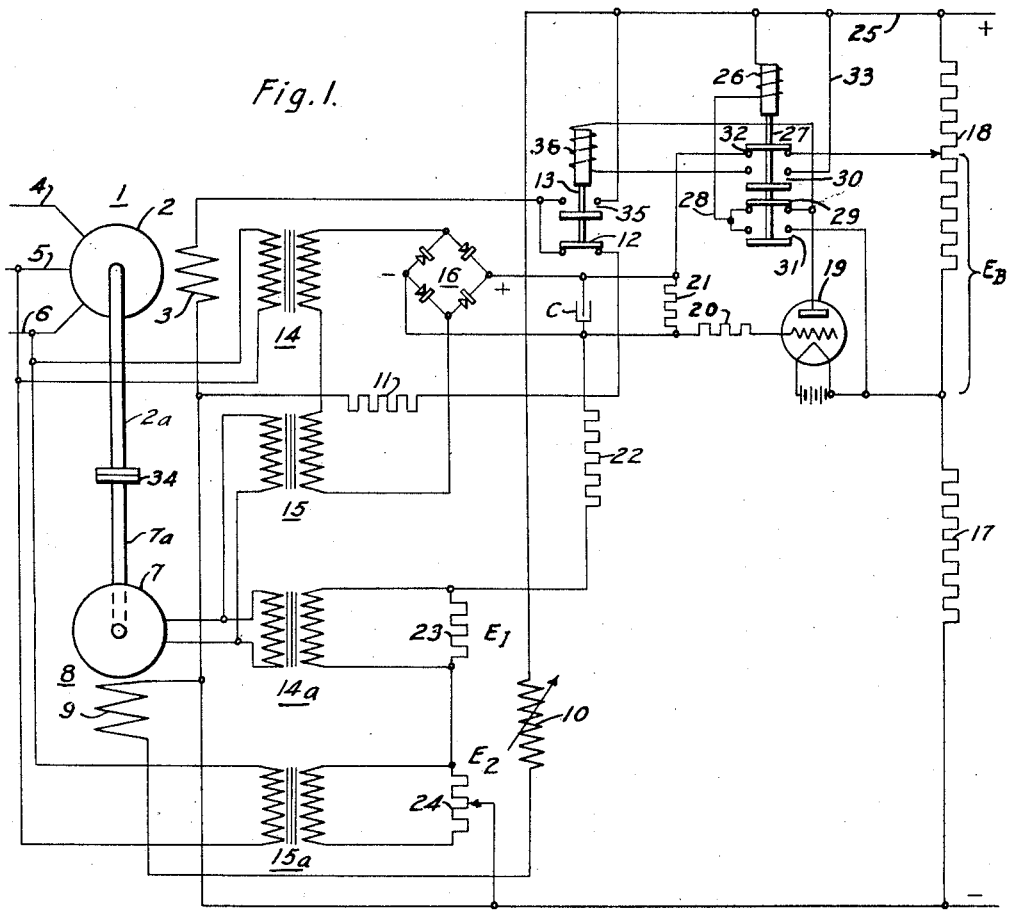
Figure 2:
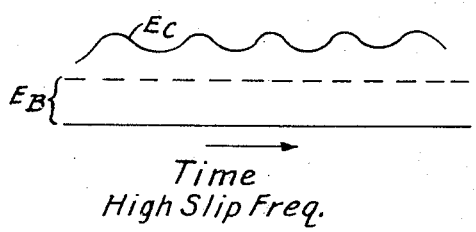
Figure 3:
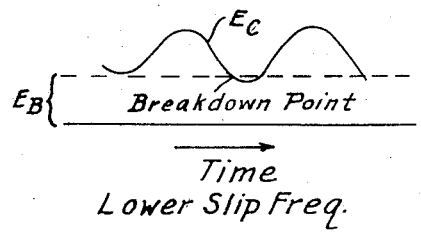

Other objects and advantages will become more apparent from a study of the following specification when considered in conjunction with the accompanying drawing, in which:

Figure 1 is a schematic showing of a control system for effecting synchronous motor starting embodying the principles of my invention; and Figs. 2 and 3 are curves showing certain voltages in the control system at different values of slip frequency.

Referring more particularly to Figure 1, numeral 1 denotes a synchronous motor having an armature or stator 2 and a field winding or rotor 3. The winding of the armature 2 is energized by a polyphase source of alternating current which is applied to the conductors 4, 5, and 6. Mechanically coupled to the shaft of the armature 2 is the armature 7 of a pilot generator 8. The field winding 9 of the pilot generator is energized from a source of direct current indicated by the terminals + and −, and such energization is variable by means of the variable resistor 10 which is in the field winding circuit. A conventional discharge resistor 11 normally short-circuits field winding 3 during the starting operation of the synchronous motor through contact members 12 of the relay 13.

Transformers 14 and 15 are provided to energize a control circuit discussed more clearly hereinafter. The primary of transformer 14 is energized by one of the phases (conductors 5—6) of the alternating current source of supply, whereas the primary of transformer 15 is energized by voltage which is generated by the pilot generator armature 7, the latter, of course, being dependent upon the speed of the armature 2 of the synchronous motor. It will be seen, therefore, that a voltage having a beat frequency corresponding to the difference of the frequency of the alternating current supplying voltage and the pilot generator voltage will be induced in a circuit which includes the secondary windings of transformers 14 and 15 and which circuit also includes a bridge type copper-copper-oxide rectifier 16. Likewise, transformers 14a and 15a will be energized by the same sources of supply as transformers 14 and 15 respectively, hence, a similar beat voltage will occur in a circuit including the secondary windings of transformers 14a and 15a. Transformers 14a and 15a are preferably peak transformers, that is, of the type which produce a peaked wave form as distinguished from transformers 14 and 15 which should produce a wave form substantially of sine wave formation.

The purpose of peak wave forms of voltages $E_1$ and $E_2$ which occur across potentiometers 23 and 24 which shunt secondaries of transformers 14a and 15a, respectively, is to provide a more accurate and reliable control which will effect attainment of a sufficient positive potential on the grid of tube 19 when the peak voltages are matched or are substantially in exact phase equality.

The output terminals of rectifier 16 indicated by + and — are connected across a condenser C. Thus, it will be seen that a rectified or pulsating unidirectional voltage will be applied across the terminals of condenser C.

Across the terminals of the direct current source are provided potentiometers 17 and 18. A grid control thermionic tube 19 is provided, which tube has its cathode connected to a point located between potentiometers 17 and 18 and has its grid connected through resistors 20 and 21 to a point along potentiometer 18, which point is adjustable, as shown.

Let $E_B$ denote the voltage between the cathode of tube 19 and the point along potentiometer 18 at which the variable contact arm is located and let $E_C$ denote the voltage across condenser C. Assume now that the synchronous motor has just been started. Therefore, the beat frequency is of substantially high value. Then these characteristics will be such as represented in Fig. 2 which represents the voltage $E_B$ and $E_C$ at high slip frequencies. The grid voltage on tube 19 is determined by the difference of voltages $E_C$ and $E_B$. Hence, during high slip frequency the resultant grid voltage will not reach a sufficiently positive value to cause tube 19 to become ionized. Inasmuch as resistor 22 is of a comparatively high value, the voltages $E_1$ and $E_2$ occurring across potentiometers 23 and 24, respectively, do not have any effect on the grid voltage during this period of the operating cycle. Let us assume now that the motor 1 has increased in speed and has almost attained synchronous speed, the voltage characteristic of $E_B$ and $E_C$ will now be substantially as shown in Fig. 3 due to the fact that each half-cycle impulse has had more time to charge condenser C. At the point the voltage wave $E_C$ dips below the voltage value $E_B$, a breakdown of tube 19 will occur, thus completing a circuit from the positive terminal of the direct current source to conductor 25, the actuating coil 26 of relay 27, conductor 28, bridged contact members 29, to the anode, thence to the cathode of tube 19 through potentiometer resistor 17 to the negative terminal of the direct current source. Energization of actuating coil 26 will effect closure of contact members 30 and 31 and opening of contact members 32 and 29. It will thus be seen that a holding circuit from the + terminal of the direct current source to conductor 25, coil 26, conductor 28 through bridged contact members 31, and potentiometer 17 to the negative terminal of the direct current source will be provided to maintain coil 26 in an energized condition.

Another circuit will be completed from the positive terminal of the direct current source to conductors 25 and 33, bridged contact members 30, the actuating coil 36, of relay 13 to the anode, thence to the cathode of tube 19, through resistor 17 to the negative (—) terminal of the direct current source. Energization of actuating coil 36 will effect closure of contact members 35, thus completing the circuit from the direct current source of supply through field winding 3 and will effect opening of contact members 12, thus interrupting the circuit through discharge resistor 11.

Since the completion of the last mentioned circuit is dependent upon ionization of tube 19, such circuit completion will not occur until impulse voltages $E_1$ and $E_2$ are matched so as to apply sufficient positive potential on the grid of tube 19. When this occurs, that is, when voltages $E_1$ and $E_2$ substantially coincide at their peak values, this will be indicative of the fact that a predetermined relation exists between the pole pieces on which the field winding 3 is wound and a particular point on the wave of alternating current supplied to the armature 2 to the afford maximum pull-in torque. This point for obtaining maximum pull-in torque may be determined by varying the angular relationship between shaft 2a of the armature of the synchronous motor and shaft 7a of the armature of pilot generator, which angular adjustment can be effected through a suitable coupling member 34 by a "cut and try" method, for example.

Sometimes it is desirable to so adjust coupling member 34 that a fair amount of pull-in torque rather than the maximum value thereof may be obtained at synchronization. In other words, in many instances, if maximum pull-in torque is selected, under certain load conditions, the line disturbances may be too great.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, a beat frequency circuit which has induced therein an alternating voltage of a frequency which is the beat frequency of that of said alternating current source and said alternating current pilot generator means, electronic control means responsive to a predetermined small value of said beat frequency to set up or partially complete a circuit between said direct current source and field coil, a second beat frequency circuit which also has induced therein the same beat frequency voltage as in said first beat frequency circuit and which is effective subsequent to the occurrence of said predetermined small value of beat frequency to complete the circuit between said direct current source and field winding at a time when the pole pieces upon which said field winding is wound have a predetermined position with respect to a given point on the wave of alternating current supplied to said armature so as to afford maximum pull-in torque at synchronization.

2. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, a beat frequency circuit which has induced therein an alternating voltage of a frequency which is the beat frequency of that of said alternating current source and said alternating current pilot generator means, electronic control means responsive to a predetermined small value of said beat frequency to set up or partially complete a circuit between said direct current source and field coil, a second beat frequency circuit which also has induced therein the same beat frequency voltage as in said first beat frequency circuit except that it is of a more peaked wave form and which is effective subsequent to the occurrence of said predetermined small value of beat frequency to complete the circuit between said direct current source and field winding at a time when the pole pieces upon which said field winding is wound have a predetermined position with respect to a given point on the wave of alternating current supplied to said armature so as to afford maximum pull-in torque at synchronization.

3. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, electronic control means including a grid controlled thermionic tube which is responsive to the beat frequency of said alternating current supply voltage and said alternating current pilot generator means, angle switching means, a pair of relays, one of which relays is energizable as the result of operation of said electronic control means due to attainment of a predetermined low value of beat frequency voltage to partially complete a circuit through the second relay and at the same time transfer control of said electronic control means to said angle switching means, said angle switching means being then effective to energize the second relay and complete a circuit between said direct current source and said field winding at a moment when maximum pull-in torque will occur during synchronization.

4. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, electronic control means including a grid controlled thermionic tube which is responsive to the beat frequency of said alternating current supply voltage and said alternating current pilot generator means, angle switching means, a pair of relays, one of which relays is energizable as the result of operation of said electronic control means due to attainment of a predetermined low value of beat frequency voltage to partially complete a circuit through the second relay and at the same time transfer control of said electronic control means to said angle switching means, said angle switching means being then effective to energize the second relay and complete a circuit between said direct current source and said field winding at a moment when maximum pull-in torque will occur during synchronization and means for varying said angle switching means so that a value less than maximum pull-in torque can be obtained during synchronization.

5. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, a beat frequency circuit which has induced therein an alternating voltage of a frequency which is the beat frequency of that of said alternating current source and said alternating current pilot generator means, electronic control means responsive to a predetermined small value of said beat frequency to set up or partially complete a circuit between said direct current source and field coil, a second beat frequency circuit which also has induced therein the same beat frequency voltage as in said first beat frequency circuit, angle switching means, a pair of relays, one of which relays is energizable as the result of operation of said electronic control means due to attainment of a predetermined low value of beat frequency voltage to partially complete a circuit through the second relay and at the same time transfer control of said electronic control means to said angle switching means, said angle switching means being then effective to energize the second relay and complete a circuit between said direct current source and said field winding at a moment when maximum pull-in torque will occur during synchronization.

6. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, a beat frequency circuit which has induced therein an alternating voltage of a frequency which is the beat frequency of that said alternating current source and said alternating current pilot generator means, electronic control means responsive to a predetermined small value of said beat frequency to set up or partially complete a circuit between said direct current source and field coil, a second beat frequency circuit which also has induced therein the same beat frequency voltage as in said first beat frequency circuit except that it is of a more peaked wave form, angle switching means, a pair of relays, one of which relays is energizable as the result of operation of said electronic control means due to attainment of a predetermined low value of beat frequency voltage to partially complete a circuit through the second relay and at the same time transfer control of said electronic control means to said angle switching means, said angle switching means being then effective to energize the second relay and complete a circuit between said direct current source and said field winding at a moment when maximum pull-in torque will occur during synchronization.

7. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, a pair of beat frequency circuits each of which has induced therein an alternating current voltage of a frequency which is the beat frequency of that of said alternating current source and said alternating current pilot generator means, electronic control means including a grid controlled thermionic tube which grid is influenced only by the first of said beat frequency circuits up to the time said beat frequency decreases to a predetermined low value, means for transferring the control to the second beat frequency in response to said predetermined low value, angle switching means responsive to said second beat frequency circuit for completing a connection between said direct current source and field winding at a moment when maximum pull-in torque is afforded due to a predetermined relation between the pole pieces upon which said field winding is wound and a given point on the alternating current wave supplied to the armature.

8. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, a pair of beat frequency circuits each of which has induced therein an alternating current voltage of a frequency which is the beat frequency of that of said alternating current source and said alternating current pilot generator means, electronic control means including a grid controlled thermionic tube which grid is influenced only by the first of said beat frequency circuits up to the time said beat frequency decreases to a predetermined low value, a pair of relays which are successively controllable by said electronic control means, the first relay being actuable in response to a predetermined decrease in beat frequency in said first beat frequency circuit and being effective to maintain itself in an energized condition and transfer the control to the second beat frequency circuit, the second relay being effective to complete a circuit between the direct current source and the field winding at a time in the operating cycle when the maximum pull-in torque is afforded.

9. A control system for automatic starting of a synchronous motor comprising, in combination, a synchronous motor having an armature or stator winding and a field or rotor winding, alternating and direct current sources of supply for energizing said armature and field windings, respectively, an alternating current pilot generator means for producing an alternating current voltage having a frequency corresponding to the speed of said synchronous motor, a pair of beat frequency circuits each of which has induced therein an alternating current voltage of a frequency which is the beat frequency of that of said alternating current source and said alternating current pilot generator means, electronic control means including a grid controlled thermionic tube which grid is influenced only by the first of said beat frequency circuits up to the time said beat frequency decreases to a predetermined low value, a pair of relays which are successively controllable by said electronic control means, the first relay being actuable in response to a predetermined decrease in beat frequency in said first beat frequency circuit and being effective to maintain itself in an energized condition and transfer the control to the second beat frequency circuit, the second relay being effective to complete a circuit between the direct current source and the field winding at a time in the operating cycle when the maximum pull-in torque is afforded.

FINN H. GULLIKSEN.